US012379504B2

(12) United States Patent
Gohl et al.

(10) Patent No.: US 12,379,504 B2
(45) Date of Patent: Aug. 5, 2025

(54) COMPUTER IMPLEMENTED METHOD FOR IDENTIFYING TRANSPARENT AND/OR MIRRORING PLANE CANDIDATES AND UAV USING THE SAME

(71) Applicant: Hexagon Geosystems Services AG, Heerbrugg (CH)

(72) Inventors: Pascal Gohl, Winterthur (CH); Andreas Jäger, Zürich (CH); Lukas Schmid, Zürich (CH); Pascal Strupler, Ennetbaden (CH)

(73) Assignee: HEXAGON GEOSYSTEMS SERVICES AG, Heerbrugg (CH)

( * ) Notice: Subject to any disclaimer, the term of this patent is extended or adjusted under 35 U.S.C. 154(b) by 804 days.

(21) Appl. No.: 17/704,764

(22) Filed: Mar. 25, 2022

(65) Prior Publication Data

US 2022/0334264 A1    Oct. 20, 2022

(30) Foreign Application Priority Data

Mar. 25, 2021    (EP) ..................... 21165064

(51) Int. Cl.
*G01S 17/933*    (2020.01)
*G01S 17/89*    (2020.01)
*G08G 5/55*    (2025.01)
*G08G 5/57*    (2025.01)
*G08G 5/80*    (2025.01)

(52) U.S. Cl.
CPC ........... *G01S 17/933* (2013.01); *G01S 17/89* (2013.01); *G08G 5/55* (2025.01); *G08G 5/57* (2025.01); *G08G 5/80* (2025.01); *B64U 2201/10* (2023.01)

(58) Field of Classification Search
CPC ...... G01S 17/933; G01S 17/89; G01S 7/4802; G01S 17/10; G08G 5/55; G08G 5/57; G08G 5/80; B64U 2201/10; G06F 18/22; B64C 39/02; B64D 45/00
USPC ....................................................... 356/4.07
See application file for complete search history.

(56) References Cited

U.S. PATENT DOCUMENTS

| 7,933,055 | B2 | 4/2011 | Jensen et al. |
| 9,658,335 | B2 | 5/2017 | Siercks et al. |
| 2011/0073784 | A1 | 3/2011 | Kartner et al. |
| 2014/0063489 | A1 | 3/2014 | Steffey et al. |
| 2019/0152597 | A1* | 5/2019 | Van Niekerk ............ G07C 5/08 |
| 2020/0172236 | A1* | 6/2020 | George ................. B64U 70/92 |

FOREIGN PATENT DOCUMENTS

| CN | 1217484 A | 5/1999 |
| CN | 110060332 A | 7/2019 |
| CN | 111024053 A | 4/2020 |
| CN | 111736164 A | 10/2020 |

(Continued)

OTHER PUBLICATIONS

Extended Search Report from corresponding EP Application No. 21165064.3, Sep. 10, 2021.

(Continued)

*Primary Examiner* — Md M Rahman
(74) *Attorney, Agent, or Firm* — Maschoff Brennan

(57) ABSTRACT

The invention relates to a computer implemented method for identifying transparent and/or mirroring plane candidates from measurement data resulting from scanning an environment by a laser scanner emitting distance measuring light pulses.

20 Claims, 3 Drawing Sheets

(56) References Cited

FOREIGN PATENT DOCUMENTS

| | | | |
|---|---|---|---|
| CN | 111982124 | A | 11/2020 |
| EP | 0 917 342 | A2 | 5/1999 |
| EP | 1832897 | A1 | 9/2007 |
| EP | 1890168 | A1 | 2/2008 |
| EP | 3438699 | A1 | 2/2019 |
| WO | 2013113759 | A1 | 8/2013 |

OTHER PUBLICATIONS

Green et al., "A Multi-Modal, Silicon Retina Technique for Detecting the Presence of Reflective and Transparent Barriers," IEEE Sensors Journal, Jun. 22, 2020 vol. 21, Issue No. 10, pp. 11401-11416.

Zhao et al., "Mapping with Reflection—Detection and Utilization of Reflection in 3D Lidar Scans", 2020 IEEE International Symposium on Safety, Security, and Rescue Robotics (SSRR), Nov. 4, 2020, pp. 27-33.

CN Office Action dated Feb. 26, 2025 as received in Application No. 202210268794.4.

\* cited by examiner

COMPUTER IMPLEMENTED METHOD FOR IDENTIFYING TRANSPARENT AND/OR MIRRORING PLANE CANDIDATES AND UAV USING THE SAME

FIELD OF THE INVENTION

The invention relates to a computer implemented method for identifying transparent or mirroring plane candidates from measurement data resulting from scanning an environment by a laser scanner emitting distance measuring light pulses. The invention further relates to an unmanned aerial vehicle (UAV) using the method for supporting its autonomous navigation functionality.

BACKGROUND

Laser scanners are used in many applications to digitize an environment by capturing a point cloud. In many applications this is done by using a laser distance measuring unit (Laser-Range-Finder, Laser-Radar, LIDAR), with a distance measurement beam being formed by at least one distance measuring light pulse. The distance measuring beam is moved and/or deflected to scan the environment, e.g. with a beam pointing unit that moves and/or deflects the distance measurement beam around two scanning axes. Thereby, points of the environment can be measured. The measurement typically relates to measuring a point's coordinates by measuring a distance and a direction to the point, but can also relate to measuring a point related intensity or other point related measurement parameters. The measured points, e.g. the coordinates, distances, directions, intensities etc., determined based on recorded coordinate data, distance data, direction data, intensity data etc., can be stored in the form of a point cloud comprising the measured points, e.g. the coordinates, distances, directions, intensities etc. and/or the coordinate data, distance data, direction data, intensity data etc.

An exemplary laser scanner is disclosed e.g. in WO 2013/113759, US 2014/063489, EP 1 890 168, etc.

A problem related to laser scanning an environment is, that not all surfaces/planes are equally well measurable. Laser scanners, in particular infrared laser scanners, usually have problems measuring transparent and/or reflective/mirroring surfaces/planes. Regularly, those kind of surfaces/planes themselves are not detected, instead the measurement beam can be reflected on the surface/plane or passing through the surface/plane, which leads to false distance measurements and false measured points in the point cloud. These false measured points usually need to be removed, which is mostly done manually, e.g. by hand curating the captured point cloud. Recently, it has been suggested to—at least partially—assist the manual removal of false measured points by sophisticated and computationally intensive post processing algorithms.

In the different technical field of topographic LiDAR, as disclosed in EP 1 832 897 or in EP 3 438 699, topographic points of the environment are measured. Therein, it is suggested to use captured waveforms of return signals, instead of single discrete reflection data, for discerning vegetation from ground during post processing of a point cloud. Such topographic LiDAR devices are typically flying along a planned path high above ground, while the measurement beam swivels along a substantially path-orthogonal line.

The waveform capturing provides additional information, but yet still brings and leaves ambiguity, as the waveforms can be interpreted in many different ways. Often at least some pre-knowledge of the expected topography is required for a reliable interpretation of the waveforms.

It is therefore an object to improve a laser scanning application, by enabling an improved identification of reflective/mirroring and/or transparent surfaces/planes, by enabling an identification of plane candidates, where a reflective/mirroring and/or transparent surface/plane potentially is present.

It is a further object to improve laser scanning applications relating to scanning an environment from a moving vehicle, in particular from an unmanned vehicle such as an unmanned aerial vehicle (UAV) or an unmanned ground vehicle (UGV), in which applications the laser scanner moves with respect to the scanned environment during scanning.

An improved identification of reflective/mirroring and/or transparent surfaces/planes can e.g. support and thereby improve a collision avoidance system of a UAV because collisions with glass windows, storefronts, or other transparent or reflective/mirroring surfaces/planes in the environment can be avoided. This can be important for e.g. a drone being used for measuring or inspecting buildings aiding laser scanning but also for navigating a general purpose drone flying in an environment with glass and/or reflective/mirroring surfaces.

An improved identification of reflective/mirroring and/or transparent surfaces/planes can e.g. enable an improved digitization of buildings or rooms, which comprise reflective/mirroring and/or transparent surfaces/planes, such as windows, glass doors, glass walls, mirrors, etc. Thereby, the improvement relates to enabling a correct representation/measurement of the reflective/mirroring and/or transparent surfaces/planes.

Those objects are achieved by realizing the features of the independent claims. Features, which further develop the invention in an alternative or advantageous manner are described in the dependent patent claims.

SUMMARY

The invention relates to a computer implemented method for identifying transparent and/or mirroring plane candidates from measurement data resulting from scanning an environment by a, in particular mobile, laser scanner emitting distance measuring light pulses, the method including the steps of providing measurement data being used for generating a point cloud representing the environment, and identifying based on the measurement data transparent or mirroring plane candidates, wherein measurement data being obtained by recording, for an, in particular for each, emitted distance measuring light pulse, a time characteristic of a reception signal resulting from detecting backscattered portions of the emitted distance measuring light pulse, recognizing return pulses in the time characteristic of the reception signal, and assigning to every recognized return pulse, in particular independent from recognized return pulse characteristics, intensity information, distance information, angular information indicating an emission direction of the emitted distance measuring light pulse, and scanner pose information, indicating a position and/or orientation of the, in particular mobile, laser scanner spatially relating the recognized return pulses to each other into a spatial return pulse arrangement, recognizing a circular accumulation pattern of spatially related return pulses within the spatial return pulse arrangement, the circular accumulation pattern being of a roundish shape with a circumferentially shaped edge region, and using recognizing the circular accumulation pattern as indicator for identifying a transparent and/or mirroring plane candidate.

A transparent plane candidate relates to an object in the environment, which could potentially be or comprise a transparent plane/surface. A transparent plane is a transparent plane/surface, which is substantially transparent to the distance measuring light pulse. Such a transparent plane/surface typically is able to reflect at least portions of the distance measuring light pulse if specific circumstances are met. Such specific circumstances typically relate to the angle of incidence under which the distance measuring light pulse impinges on the transparent plane/surface. A transparent plane can be or can be comprised by e.g. a glass window, a glass door, glass wall etc.

A mirroring plane candidate relates to an object in the environment, which could potentially be or comprise a mirroring plane/surface. A mirroring plane is a mirroring plane/surface, which is reflecting the distance measuring light pulse. Such a mirroring plane/surface typically is able to reflect the distance measuring light pulse essentially completely. Thereby, reflecting the distance measuring light pulse does not necessitate specific circumstances relating to an angle of incidence. A mirroring plane can be or can be comprised by e.g. a glass mirror, metallic mirror, polished surface, metallic surface, etc.

A distance measuring light pulse relates to a pulse of distance measuring light, wherein the distance measuring light pulse is formed by emitting distance measuring light in a time-limited quantity. Distance measuring light pulses are used by the laser scanner to determine distances to points in the environment.

An emitted distance measuring light pulse, typically is reflected off objects/surfaces/planes in the environment being scanned. Portions of an as-reflected distance measuring light pulse being backscattered to the laser scanner can form a reception signal upon detection by the laser scanner. A time characteristic of such a reception signal relates to the evolution of the reception signal over time.

The time characteristic of a reception signal could be presented by a curve/graph/plot showing the evolution of the reception signal over time, e.g. by a function plot of a function with time as independent variable and the reception signal as dependent variable. The time characteristic of a reception signal may comprise one or more return pulses. A return pulse would be recognized in the curve/graph/plot as a pulse/peak-shaped section. In the pulse/peak-shaped section of the curve/graph/plot the reception signal mostly stands out from a ground signal.

A return pulse can have return pulse characteristics, which relate to e.g. a peak value of the pulse, a pulse width, a pulse shape etc.

Intensity information typically relates to the intensity of the backscattered portions of the emitted distance measuring light pulse. Intensity information can relate to e.g. a peak value of the return pulse, wherein the reception signal is proportional to the intensity of the backscattered portions of the emitted distance measuring light pulse.

Distance information typically relates to the distance to a point in the environment from which portions of the emitted distance measuring light pulse are backscattered. Distance information can relate to the point in time when the return pulse is detected.

Angular information typically relates to a first angle in a first plane and a second angle in a second plane, wherein the first plane and the second plane are substantially orthogonal to each other. The first and the second angle determine the emission direction along which the distance measuring light pulse—portions of which are backscattered to form the reception signal and return pulse—is emitted.

Scanner pose information typically relates to positional information and/or orientation information, which allow for determining the position and/or orientation of the laser scanner. Such information can be provided by e.g. GPS data, angular encoders, an inertial measurement unit etc. of the laser scanner.

The aforementioned information can be assigned to a recognized return pulse either based on a return pulse characteristic, e.g. meeting a specific criteria, or independent thereof.

A recognized return pulse can be spatially related aiding the information being assigned to it. E.g. aiding the distance and/or angular and/or scanner pose information a position in space can be assigned to a recognized return pulse. Based on this position, a recognized return pulse can be spatially related to other recognized return pulses. The spatially related recognized return pulses then have a spatial relationship to each other.

Recognized return pulses having a spatial relationship to each other, and therefore being spatially related, form a spatial return pulse arrangement.

The spatial return pulse arrangement represents a spatial distribution of the recognized return pulses. Such a spatial distribution, can have sections where recognized return pulses are accumulated, in the meaning of being closer to each other, and sections where recognized return pulses are not accumulated. A section where recognized return pulses are accumulated typically stands out from sections, where recognized return pulses are not accumulated by defining an accumulation pattern having a shape and an edge region.

If the accumulation pattern has a roundish shape with a circumferentially shaped edge region, the accumulation pattern is indicative for the therein comprised recognized return pulses to result from the detection of emitted distance measuring light pulses being at least partially backscattered from a transparent and/or mirroring plane/surface.

According to an embodiment, the method includes assigning recognized return pulses to a set of recognized return pulses based on a predefined criterion relating to the scanner pose, and spatially relating recognized return pulses of the set to each other.

A predefined criterion can relate to e.g. a position and/or orientation range of the scanner. Then recognized return pulses having assigned scanner pose information, indicating a position and/or orientation of the laser scanner within this range, are assigned to a set of recognized return pulses. This makes recognizing of circular accumulation patterns more efficient, especially when dealing with a large amount of recognized return pulses.

According to an embodiment, the method includes assigning to every recognized return pulse an identification mark, assigning recognized return pulses to a set of recognized return pulses based on a predefined criterion relating to the identification mark, and spatially relating recognized return pulses of the set to each other.

An identification mark can be a time stamp, or a number etc., which relates the recognized return pulses to each other.

A predefined criterion can relate to a time window or a number range.

This makes recognizing of circular accumulation patterns more efficient, especially when dealing with a large amount of recognized return pulses.

According to an embodiment, the identification mark is a time stamp.

According to an embodiment, the method includes providing a spatial distribution of the intensity information assigned to the recognized return pulses of the circular accumulation pattern, recognizing an intensity decay in a radially outwards direction over the circumferentially shaped edge region of the circular accumulation pattern, and using recognizing the intensity decay as further indicator for identifying a transparent and/or mirroring plane candidate.

This provides a further indicator for identifying a transparent and/or mirroring plane candidate, making the identification more reliable.

According to an embodiment, the method includes deriving a plane normal to the transparent and/or mirroring plane candidate based on at least one of the distance information, and intensity information assigned to the recognized return pulses of the circular accumulation pattern.

The plane normal can be normal to a plane to which the recognized return pulses of the circular accumulation pattern have a minimum distance. Such a plane can represent the transparent and/or mirroring plane candidate.

The plane normal can be used for determining further parameters of the transparent and/or mirroring plane candidate, making the identification of the transparent and/or mirroring plane candidate more accurate.

According to an embodiment, the method includes deriving a distance to the transparent and/or mirroring plane candidate based on at least one of distance information, and intensity information assigned to the recognized return pulses of the circular accumulation pattern.

The distance can be the distance from a plane or point to a plane to which the recognized return pulses of the circular accumulation pattern have a minimum distance. Such a plane can represent the transparent and/or mirroring plane candidate.

The distance can be used for determining further parameters of the transparent and/or mirroring plane candidate, making the identification of the transparent and/or mirroring plane candidate more accurate.

According to an embodiment, the method includes recognizing a further accumulation pattern of spatially related return pulses within a spatial return pulse arrangement, and in a surrounding of the circular accumulation pattern, the further accumulation pattern meeting a spatial correlation criterion in relation to at least one of a plane normal of, and a distance to the transparent and/or mirroring plane candidate, such that the further accumulation pattern enables determining borders to the transparent and/or mirroring plane candidate, and a transparent and/or mirroring plane/surface.

A spatial correlation criterion can be that a normal to a plane to which the recognized return pulses of the further accumulation pattern have a minimum distance matches to the plane normal of the transparent and/or mirroring plane candidate. Matching can relate to being substantially parallel.

A spatial correlation criterion can be that a distance from a plane or point to a plane to which the recognized return pulses of the further accumulation pattern have a minimum distance matches to the distance to the transparent and/or mirroring plane candidate. Matching can relate to being substantially equal.

Recognizing a further accumulation pattern, enables to determine borders to or of the transparent and/or mirroring plane candidate and thereby the identification of a transparent and/or mirroring plane/surface out of one or a plurality of transparent and/or mirroring plane candidates.

According to an embodiment, the method includes determining a transparent or mirroring surface based on the recognized circular, and further accumulation patterns.

According to an embodiment, the method includes identifying recognized return pulses to which angular information, indicating an emission direction of the emitted distance measuring light pulse, which intersects the transparent and/or mirroring surface/plane, is assigned.

Identifying such recognized return pulses enables to process a point cloud with respect to points being derived based on these return pulses and being potentially false measured points.

According to an embodiment, the method includes evaluating the identified return pulses to be return pulses of the transparent and/or mirroring surface/plane, or a surrounding of the transparent and/or mirroring surface/plane, and marking return pulses of the surrounding of the transparent and/or mirroring surface/plane.

Return pulses of the transparent and/or mirroring surface/plane are resulting from detecting distance measuring light pulses being at least partially backscattered from the transparent and/or mirroring surface/plane in the environment.

Return pulses of a surrounding of the transparent and/or mirroring surface/plane are resulting from detecting distance measuring light pulses being at least partially backscattered from a surrounding of the transparent and/or mirroring surface/plane in the environment, e.g. from behind it, from in front of it, from a side to it.

According to an embodiment, the method includes filtering the recognized return pulses with respect to marked return pulses.

The filtering enables automatically removing false measured points.

According to an embodiment, the method includes evaluating marked return pulses to be return pulses of a surrounding of the transparent and/or mirroring surface/plane, in emission direction, behind, or in front of the transparent and/or mirroring surface/plane using the principles according to the law of reflection.

The invention further relates to a computer program product including instructions, which, when the program is executed by a computer, cause the computer to carry out the computer implemented method.

The invention further relates to an unmanned aerial vehicle including a mobile laser scanner, a collision avoidance module, and a processor configured to perform the computer implemented method, wherein the collision avoidance module is configured to autonomously avoid collisions of the UAV based on identifying a transparent and/or mirroring plane candidate according to the computer implemented method.

BRIEF DESCRIPTION OF THE DRAWINGS

The invention is described below in more detail purely by way of example with the aid of concrete exemplary embodiments illustrated schematically in the drawings, further advantages of the invention also being examined. In detail.

DETAILED DESCRIPTION

Figure 1:
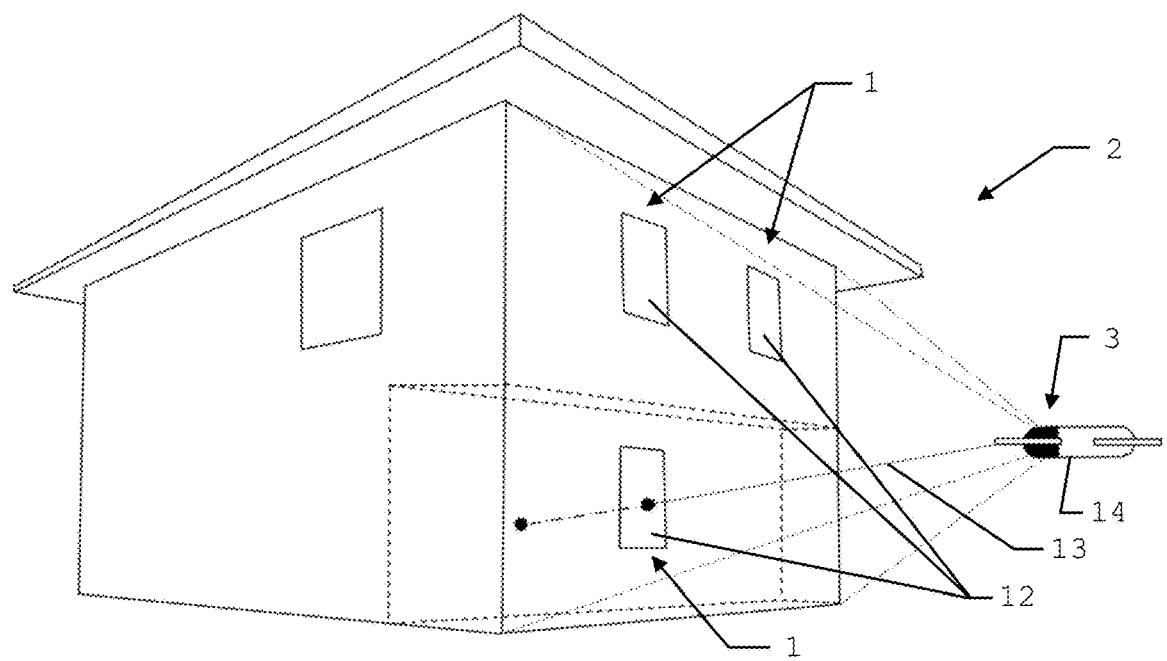
FIG. 1 shows an embodiment of a laser scanner scanning a building with windows.

FIG. 1 shows an exemplary environment 2 with a building having windows. The windows of the building represent transparent and/or mirroring plane candidates 1. A side of the building is scanned by a mobile laser scanner 3 being part of a UAV. The laser scanner 3 emits distance measuring light pulses forming distance measurement beams in a emission direction 13. A schematic of a distance measurement beam is shown intersecting a transparent and/or mirroring plane candidate and entering a section behind it, where the distance measuring beam hits a wall of the building. The distance measuring light pulse is at least partially backscattered at least from the two locations indicated in FIG. 1 by two black dots, one on the transparent and/or mirroring plane candidate and the other one on the wall behind it. The backscattered portions of the distance measuring light pulse form a reception signal being recorded over time.

Figure 2:
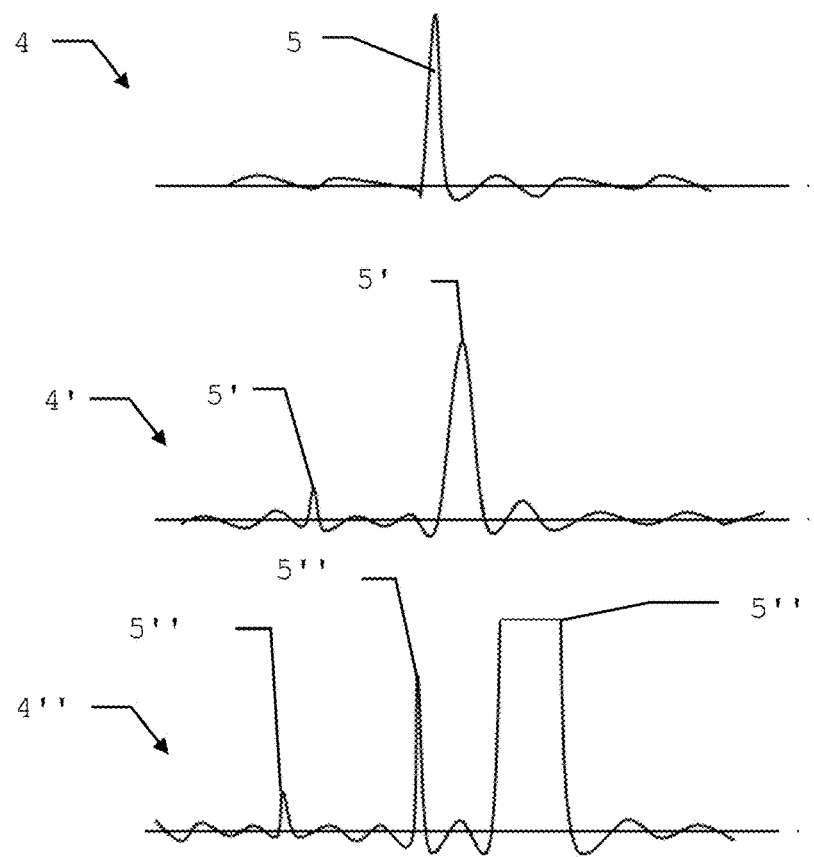
FIG. 2 shows time characteristics of reception signals according to an embodiment.

FIG. 2 shows exemplary time characteristics of reception signals 4, 4', 4". The shown time characteristics could result from detecting backscattered portions of the emitted distance measuring light pulse shown in FIG. 1 and emitted in emission direction 13. Which time characteristic actually results greatly depends on the angle of incidence under which the distance measuring light pulse impinges on the window. The time characteristics exhibit one or more return pulses 5, 5', 5". The return pulses can be peak shaped. The intensity of the return pulse can be above or below a saturation threshold of the detector detecting the backscattered portions of the emitted distance measuring light pulse. If the time characteristic of a reception signal has more than one return pulse the intensity of the return pulses can be similar or different. A return pulse between two return pulses can have can have an equal, similar or different (higher or lower) intensity than the two return pulses, wherein the two return pulses can have an equal, similar or different intensity.

Figure 3:
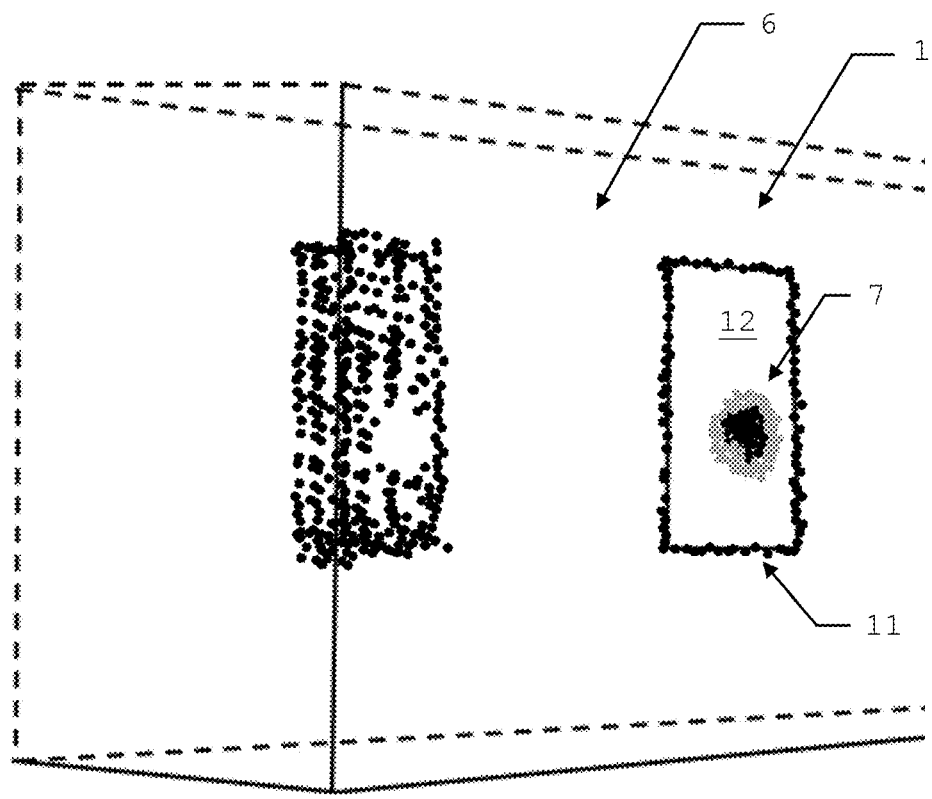
FIG. 3 shows a spatial return pulse arrangement according to an embodiment.

FIG. 3 shows a spatial return pulse arrangement 6 according to an embodiment. The spatial return pulse arrangement comprises two accumulation patterns. A first circular accumulation pattern 7 and a further accumulation pattern 11, which is rectangular shaped forming a delimitation of the transparent and/or mirroring plane candidate 1. Based on the spatial return pulse arrangement 6 and its accumulation patterns 7 and 11 the transparent and/or mirroring surface 12 is determinable according to an embodiment.

The shade of the points in FIG. 3 schematically indicates the intensity of the related recognized return pulses, wherein the lighter shade relates to a lower intensity than the darker shade.

Figure 4:
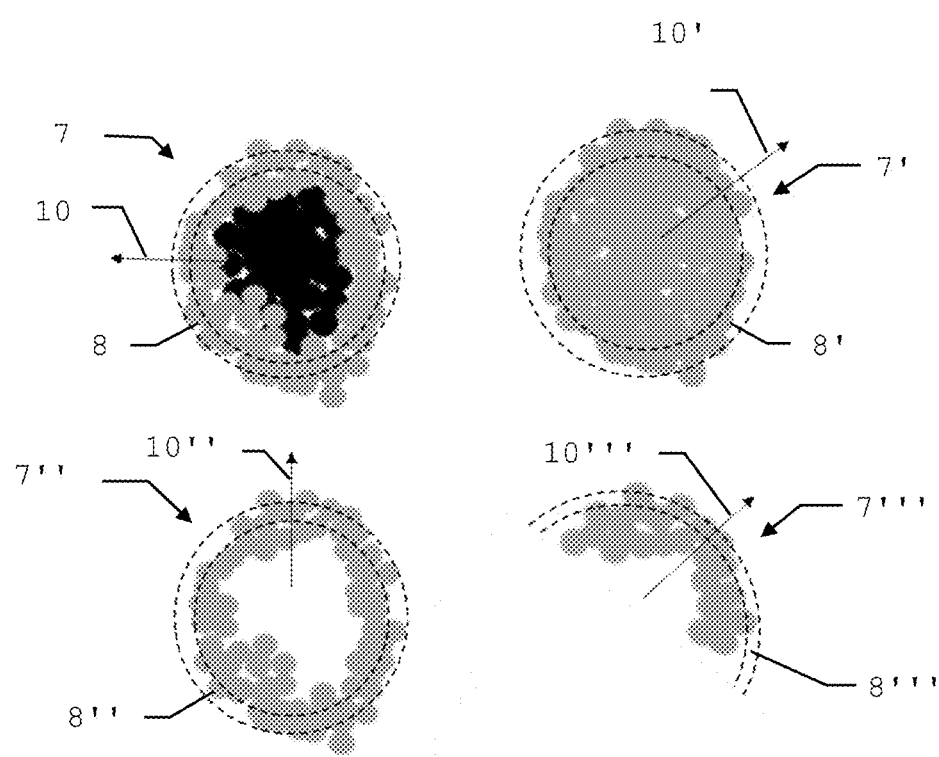
FIG. 4 shows circular accumulation patterns with circumferentially shaped edge regions according to an embodiment.

FIG. 4 shows circular accumulation patterns 7, 7', 7", 7'" with circumferentially shaped edge regions 8, 8', 8", 8'" according to an embodiment. The circular accumulation pattern is a pattern having a shape, which can be approximated by a circular shape, part of a circular shape, ring shape, part of a ring shape etc. A circular accumulation pattern has a potential mid-point, from which a radial outwards direction 10, 10', 10", 10'" over the edge region 8, 8', 8", 8'" can be defined.

Figure 5:
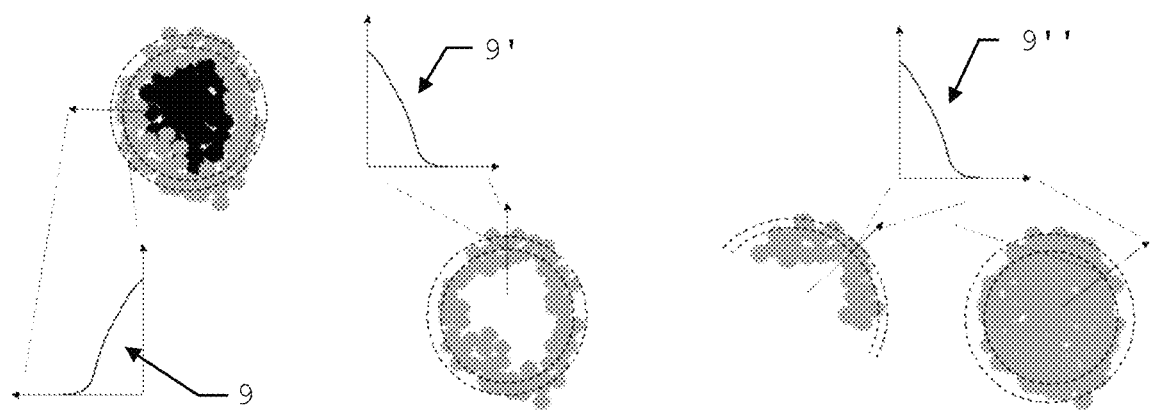
FIG. 5 shows an intensity decay in a radially outwards direction over circumferentially shaped edge regions of circular accumulation patterns according to an embodiment.

FIG. 5 shows circular accumulation patterns with circumferentially shaped edge regions. Spatially related Intensities of recognized return pulses of the circular accumulation patterns can comprise intensity evolutions in radially outwards directions, which form intensity decays 9, 9', 9" over the circumferentially shaped edge regions of the circular accumulation patterns.

It goes without saying that these figures illustrated are merely schematics of possible exemplary embodiments.

The invention claimed is:

1. A computer implemented method for identifying transparent and/or mirroring plane candidates from measurement data resulting from scanning an environment by a laser scanner emitting distance measuring light pulses, the method comprising:
   providing measurement data being used for generating a point cloud representing the environment, and
   identifying based on the measurement data transparent or mirroring plane candidates,
   the measurement data being obtained by:
      recording, for an emitted distance measuring light pulse, a time characteristic of a reception signal resulting from detecting backscattered portions of the emitted distance measuring light pulse,
      recognizing return pulses in the time characteristic of the reception signal, and
      assigning to every recognized return pulse, in particular independent from recognized return pulse characteristics:
         intensity information,
         distance information,
         angular information indicating an emission direction of the emitted distance measuring light pulse, and
         scanner pose information, indicating a position and/or orientation of the laser scanner
   spatially relating the recognized return pulses to each other into a spatial return pulse arrangement,
   recognizing a circular accumulation pattern of spatially related return pulses within the spatial return pulse arrangement, the circular accumulation pattern being of a roundish shape with a circumferentially shaped edge region, and
   using recognizing the circular accumulation pattern as indicator for identifying a transparent and/or mirroring plane candidate.

2. The computer implemented method of claim 1, wherein:
   assigning recognized return pulses to a set of recognized return pulses based on a predefined criterion relating to the scanner pose, and
   spatially relating recognized return pulses of the set to each other.

3. The computer implemented method of claim 1, further comprising:
   assigning to every recognized return pulse an identification mark,
   assigning recognized return pulses to a set of recognized return pulses based on a predefined criterion relating to the identification mark, and
   spatially relating recognized return pulses of the set to each other.

4. The computer implemented method of claim 3, wherein the identification mark is a time stamp.

5. The computer implemented method of claim 4, further comprising:
   providing a spatial distribution of the intensity information assigned to the recognized return pulses of the circular accumulation pattern,
   recognizing an intensity decay in a radially outwards direction over the circumferentially shaped edge region of the circular accumulation pattern, and using recognizing the intensity decay as further indicator for identifying a transparent and/or mirroring plane candidate.

6. The computer implemented method of claim 1, further comprising:
providing a spatial distribution of the intensity information assigned to the recognized return pulses of the circular accumulation pattern,
recognizing an intensity decay in a radially outwards direction over the circumferentially shaped edge region of the circular accumulation pattern, and
using recognizing the intensity decay as further indicator for identifying a transparent and/or mirroring plane candidate.

7. The computer implemented method of claim 1, further comprising deriving a plane normal to the transparent and/or mirroring plane candidate based on at least one of:
the distance information, and
intensity information
assigned to the recognized return pulses of the circular accumulation pattern.

8. The computer implemented method of claim 7, further comprising deriving a distance to the transparent and/or mirroring plane candidate based on at least one of:
distance information, and
intensity information
assigned to the recognized return pulses of the circular accumulation pattern.

9. An unmanned aerial vehicle comprising:
a mobile laser scanner,
a collision avoidance module, and
a processor configured to perform the computer implemented method of claim 8,
wherein the collision avoidance module is configured to autonomously avoid collisions of the UAV based on identifying a transparent and/or mirroring plane candidate.

10. The computer implemented method of claim 1, further comprising deriving a distance to the transparent and/or mirroring plane candidate based on at least one of:
distance information, and
intensity information
assigned to the recognized return pulses of the circular accumulation pattern.

11. The computer implemented method of claim 10, further comprising recognizing a further accumulation pattern of spatially related return pulses:
within a spatial return pulse arrangement, and
in a surrounding of the circular accumulation pattern,
the further accumulation pattern meeting a spatial correlation criterion in relation to at least one of:
a plane normal of, and
a distance to;
the transparent and/or mirroring plane candidate, such that the further accumulation pattern enables determining:
borders to the transparent and/or mirroring plane candidate, and
a transparent and/or mirroring surface.

12. The computer implemented method of claim 1, recognizing a further accumulation pattern of spatially related return pulses:
within a spatial return pulse arrangement, and
in a surrounding of the circular accumulation pattern,
the further accumulation pattern meeting a spatial correlation criterion in relation to at least one of:
a plane normal of, and
a distance to;
the transparent and/or mirroring plane candidate, such that the further accumulation pattern enables determining:
borders to the transparent and/or mirroring plane candidate, and
a transparent and/or mirroring surface.

13. The computer implemented method of claim 12, further comprising determining a transparent or mirroring surface based on the recognized:
circular, and further
accumulation patterns.

14. The computer implemented method of claim 13, further comprising recognized return pulses to which angular information, indicating an emission direction of the emitted distance measuring light pulse, which intersects the transparent and/or mirroring surface, is assigned.

15. The computer implemented method of claim 13, further comprising:
evaluating the identified return pulses to be return pulses of:
the transparent and/or mirroring surface, or
a surrounding of the transparent and/or mirroring surface, and
marking return pulses of the surrounding of the transparent and/or mirroring surface.

16. The computer implemented method of claim 15, further comprising evaluating marked return pulses to be return pulses of a surrounding of the transparent and/or mirroring surface, in emission direction:
behind, or
in front of
the transparent and/or mirroring surface using the principles according to the law of reflection.

17. The computer implemented method of claim 13, further comprising filtering the recognized return pulses with respect to marked return pulses.

18. The computer implemented method of claim 17, further comprising evaluating marked return pulses to be return pulses of a surrounding of the transparent and/or mirroring surface, in emission direction:
behind, or
in front of
the transparent and/or mirroring surface using the principles according to the law of reflection.

19. A computer program product including instructions which, when the program is executed by a computer, cause the computer to carry out the computer implemented method of any of claim 1.

20. An unmanned aerial vehicle comprising:
a mobile laser scanner,
a collision avoidance module, and
a processor configured to perform the computer implemented method of claim 1,
wherein the collision avoidance module is configured to autonomously avoid collisions of the UAV based on identifying a transparent and/or mirroring plane candidate.

* * * * *